United States Patent [19]

Bowman et al.

[11] Patent Number: 4,966,044
[45] Date of Patent: Oct. 30, 1990

[54] DIRECTIONAL CONTROL SYSTEM FOR A TRACTOR TRANSMISSION

[75] Inventors: Barry A. Bowman, Maplewood, Minn.; Stanley J. Jeziorski, Darien, Ill.; Francis A. Peterson, Clarinden Hills, Ill.; Ralph D. Price, Bolingbrook, Ill.

[73] Assignee: J. I. Case Company, Racine, Wis.

[21] Appl. No.: 347,174

[22] Filed: May 30, 1989

[51] Int. Cl.$^5$ .............................................. F16H 59/10
[52] U.S. Cl. ............................... 74/335; 74/473 SW; 200/332
[58] Field of Search .................... 74/473 SW, 335; 200/331, 332

[56] References Cited

U.S. PATENT DOCUMENTS

| 2,964,964 | 12/1960 | Craig | 74/335 |
| 3,853,019 | 12/1974 | McAdams | 74/473 R |
| 3,954,021 | 5/1976 | Mraz | 74/473 R |
| 4,040,306 | 8/1977 | Jensen | 74/334 |
| 4,215,771 | 8/1980 | Huitema | 192/3.54 |
| 4,494,418 | 1/1985 | Bellah et al. | 74/475 |
| 4,641,545 | 2/1987 | Rabe | 74/476 |
| 4,649,768 | 3/1987 | Kusaka et al. | 74/473 SW |
| 4,676,114 | 6/1987 | Ida et al. | 74/335 |
| 4,680,983 | 7/1987 | Brown | 74/335 |

FOREIGN PATENT DOCUMENTS

| 453453 | 12/1948 | Canada | 200/331 |
| 858132 | 8/1981 | U.S.S.R. | 200/332 |
| 783554 | 9/1957 | United Kingdom | 200/331 |
| 2177764 | 1/1987 | United Kingdom | 74/335 |

Primary Examiner—Dwight Diehl
Assistant Examiner—Scott Anchell
Attorney, Agent, or Firm—Dressler, Goldsmith, Shore, Sutker & Milnamow, Ltd.

[57] ABSTRACT

A single lever directional control system for positively conditioning a tractor transmission for either a forward or reverse mode of operation. The control system includes a controller for engaging the transmission in either of two modes of operation as a function of the electrical signals directed to the controller, an electrical switch for directing electrical signals to the controller as a function of the operative state of the switch, and an over-center control lever for controlling the operative state of the switch. The over-centering of the control lever positively positions the lever in either of two positions corresponding to the two modes of operation of the transmission. Precise shifting of the transmission is facilitated by configuring the control lever for movement in two distinct directions of movement to shift the transmission.

6 Claims, 2 Drawing Sheets

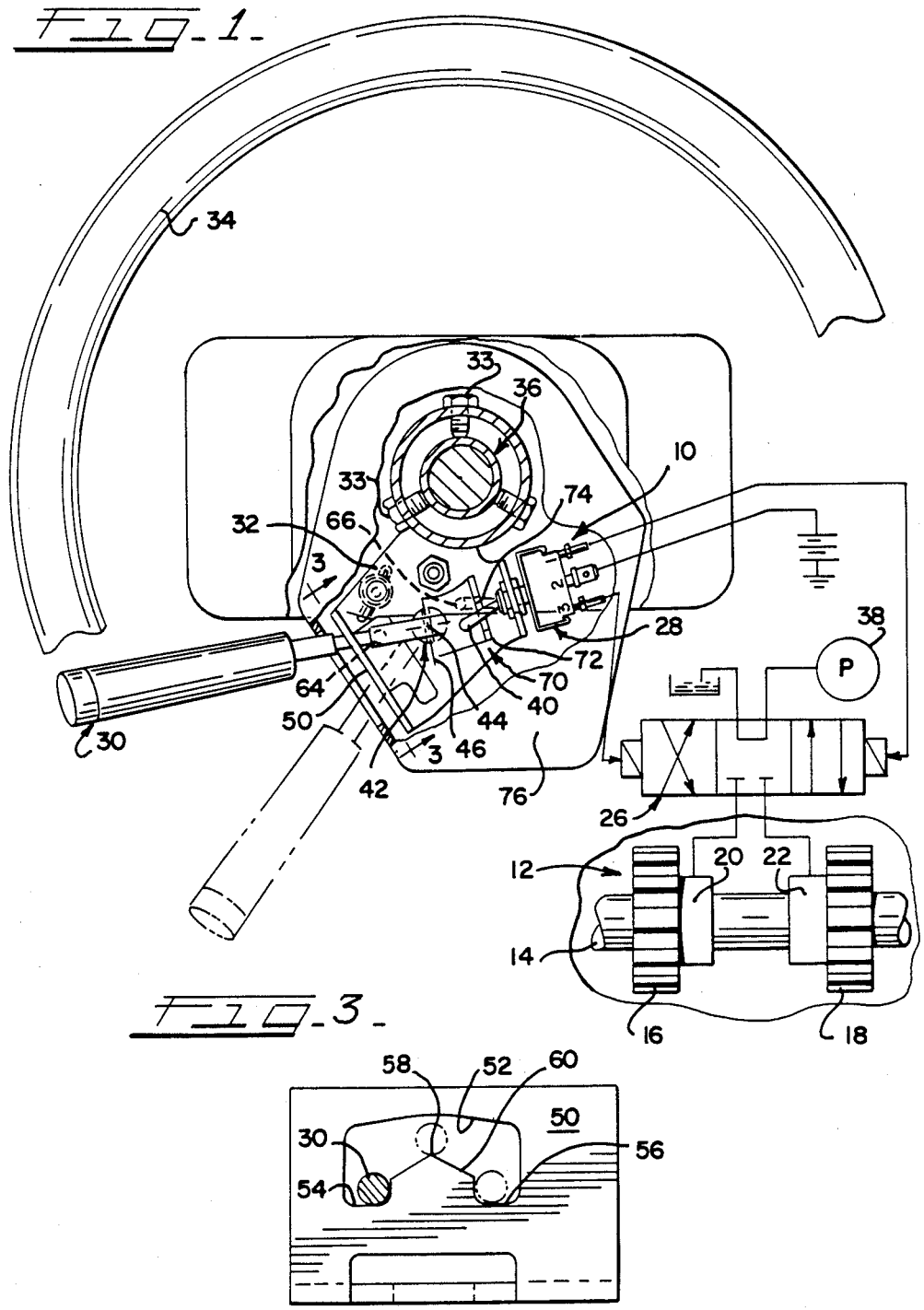

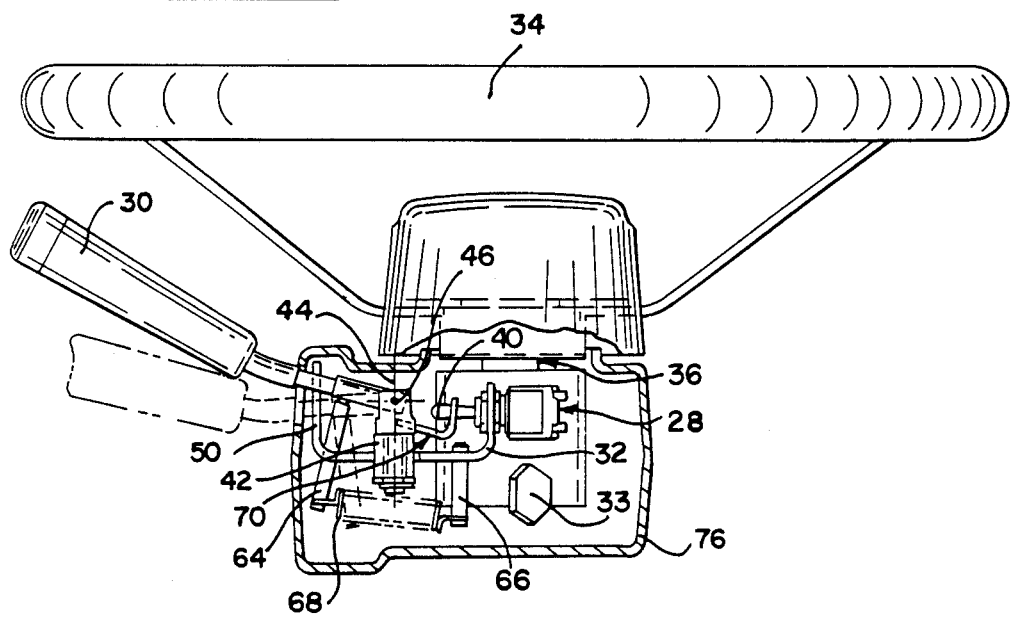
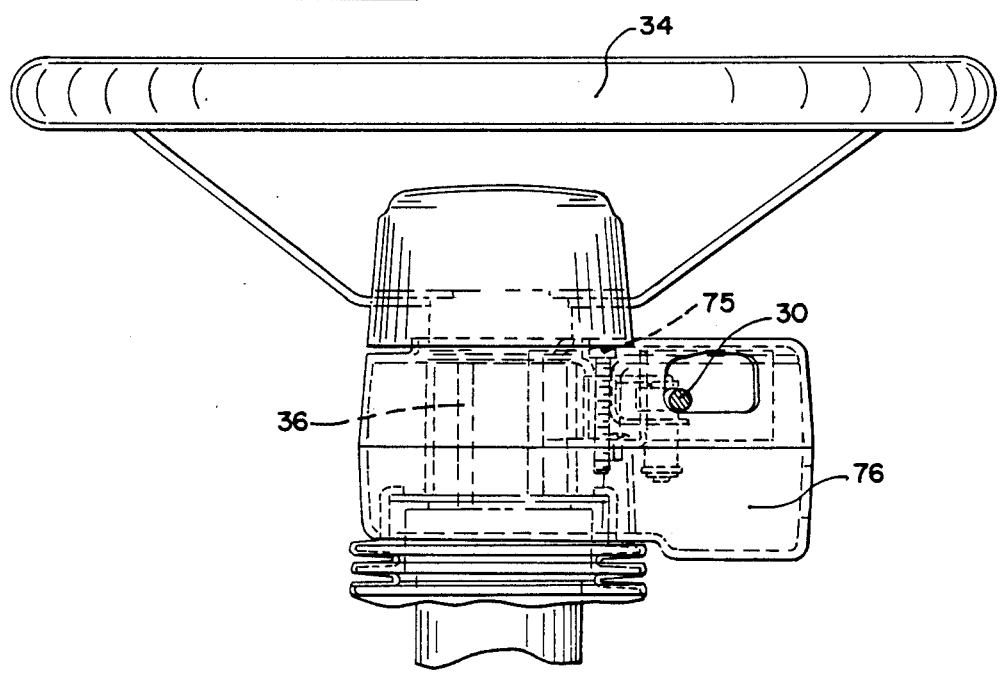

DIRECTIONAL CONTROL SYSTEM FOR A TRACTOR TRANSMISSION

FIELD OF THE INVENTION

The present invention generally relates to transmission control systems and, more particularly, to a single lever directional control system which positively conditions a transmission of an agricultural implement for either of two modes of operation, such as forward-/reverse directional control.

BACKGROUND OF THE INVENTION

Agricultural equipment, such as large heavy-duty tractors and the like, normally incorporate multispeed transmissions which provide a wide range of speeds and a neutral condition for the tractor. The transmission can be further conditioned for forward and reverse modes of operation.

To condition the tractor in either a forward or reverse mode of operation, a fulcrumed foot pedal is sometimes provided on the floor of the tractor. The foot pedal is typically connected through articulated linkages to mechanisms which control transmission operation. In such arrangements, the foot pedal is depressed by the operator's toe to establish a forward mode of operation and is depressed by the operator's heel to establish a reverse mode of operation.

As will be appreciated, during tractor operation an operator's attention is often divided amongst several different functions which occur substantially simultaneously. The required positioning of the foot pedal for controlling tractor operation, coupled with a myriad of other tasks required of the operator can complicate tractor operation, thus detracting from convenient and efficient control. Naturally, convenient equipment operation desirably facilitates efficient and productive agricultural operations.

SUMMARY OF THE INVENTION

In view of the above, and in accordance with the present invention, there is provided a directional control system which positively conditions a transmission of an agricultural implement for either a forward or reverse mode of operation. Through use of a, readily manipulated single lever, forward or reverse selection for the transmission is simplified and permits the operator to condition the transmission into either mode of operation by use of a conveniently positioned hand lever.

The directional control system of the present invention includes a controller for engaging the transmission in either one of two modes of operation as a function of the electrical signals directed to the controller, an electrical switch for directing electrical signals to the controller as a function of the operative state of the switch, and an operator controlled lever for controlling the operative state of the electrical switch and thereby the mode of operation of the mechanism. The lever is normally retained in either of two positions by an over-center arrangement.

In the illustrated embodiment, the electrical switch and operator controlled lever are carried on a steering column of the tractor and are arranged within easy reach of the operator. In a preferred form, the controller includes an electrically controlled shift valve for hydraulically engaging the tractor transmission in either a forward or reverse mode of operation as a function of the electrical signals directed thereto. The switch is connected to an electrical power source and includes a switch actuator for controlling the operative state of the switch. The switch actuator is movable between two positions such that electrical trigger signals are directed to the shift valve as a function of the position of the switch actuator. The control lever passes through a gate and is pivotally connected to the support for combined horizontal and vertical movement between forward and reverse positions corresponding to the forward and reverse modes of operation of the transmission.

The control lever is preferably connected to the support through a shaft which is rockable about a first axis in the support. The control lever is also pivotally connected to the shaft about a second axis.

The gate through which the control lever extends defines two spaced detents corresponding to the two modes of operation of the mechanism. The detents are joined such that as the control lever is moved between the detents to change the operative state of the of the switch and thereby the mode of operation of the mechanism, the lever is caused to move both horizontally and vertically as provided for by the axes about which the control lever pivots. An over-center spring resiliently urges the lever toward one or the other of the two detents depending upon the disposition of the lever with respect to the center of the gate.

In a preferred form of the invention, the center of the gate is vertically positioned above the forward and reverse detents and the spring positively moves the shift lever toward either a forward or reverse position so as to impede the lever from being inadvertently located between the detents.

A lost motion mechanism operatively connects the control lever to the electrical switch. The lost motion mechanism allows extended movement of the lever between the spaced detents in the gate and which causes a consequent change in the operative state of the electrical switch. In a preferred form of the invention, the lost motion mechanism includes an actuator plate connected to the shift lever. The actuator plate defines an elongated sidewise slot permitting relative movement between the shift lever and the switch actuator.

The directional selection system of the present invention positively conditions the transmission into either a forward or reverse mode of operation thereby facilitating precise and convenient control of the tractor. The gate through which the control lever passes is designed to impede the control lever from being inadvertently located between either one of the two detents and thereby positively facilitates engagement of the transmission in one of its two modes of operation. Moreover, the gate is sized by design to require the control lever to move in two distinct directions of motion to shift the transmission from one mode of operation to another in a manner inhibiting inadvertent shifting of the transmission. Positioning of the control lever in one of the two detents is assured by a combination of the over-center arrangement and downward action imparted to the control lever by the over-centering spring.

Numerous other features and advantages of the present invention will become readily apparent from the following detailed description, the accompanying drawings, and the appended claims.

BRIEF DESCRIPTION OF THE DRAWINGS

FIG. 1 is a diagrammatic illustration of a drive selection system according to the present invention in which forward and reverse drive directions for an agricultural implement are engaged by hydraulically operated clutches whose hydraulic clutch engaging pressure is controlled by a solenoid-operated valve;

FIG. 2 is a fragmentary side elevational view, partially broken away, of a portion of the drive selection system illustrated in FIG. 1;

FIG. 3 is an enlarged side elevational view of a gate forming part of the present invention; and FIG. 4 is a side elevational view similar to FIG. 2.

DETAILED DESCRIPTION OF A PREFERRED EMBODIMENT

While the present invention is susceptible of embodiment in various forms, there is shown in the drawings and will hereinafter be described a presently preferred embodiment with the understanding that the present disclosure is to be considered as an exemplification of the invention, and is not intended to limit the invention to this specific embodiment illustrated.

Referring now to the drawings, wherein like reference numerals indicate like parts throughout the several views, there is shown a control arrangement 10 for positively conditioning a mechanism for either of at least two modes of operation. The control arrangement 10 is diagrammatically illustrated as a directional selection system for an agricultural tractor transmission 12 or the like.

A schematic fragmentary illustration of the transmission 12 is provided in FIG. 1. As illustrated, transmission 12 includes a shaft 14 on which a forward gear 16 and a reverse gear 18 are mounted. A forward clutch 20 is provided adjacent gear 16 to establish a forward mode of operation for the transmission. A reverse clutch 22 is provided adjacent gear 18 to establish a reverse mode of operation for the transmission.

The control arrangement 10 of the present invention includes a controller 26, an electrical switch assembly 28 for directing electrical signals to the controller 26, and an over-center operator controlled shift lever 30, which is arranged within easy reach of an operator. Arranging the lever 30 within easy reach of the operator facilitates efficient and convenient control of the transmission. In the illustrated embodiment, the switch assembly 28 and operator control shift lever 30 are carried by a support 32.

The support 32 is preferably affixed to a steering column of the tractor, as with fasteners 33, so as to be readily accessible to the vehicle operator. The steering column is represented in FIGS. 1, 2 and 4 by a steering wheel 34 which is mounted on a shaft assembly 36. The steering column is preferably of the type illustrated in U.S. Pat. No. 3,799,569 and forms no part of the present invention.

Returning to FIG. 1, the forward and reverse clutches 20 and 22 respectively, are operated by hydraulic pressure supplied from a pump 38 via the controller 26. In the illustrated embodiment, controller 26 is an electrically controlled three position hydraulic shift valve having electrical solenoids at opposite ends thereof. The shift valve hydraulically engages the transmission in either a forward or reverse mode of operation as a function of the electrical signals directed thereto from the switch assembly 28.

Switch assembly 28 is secured to the support 32 and is connected to an electrical source of power. Preferably, the switch assembly is a conventional two position toggle switch having an actuator 40 which is positioned from side-to-side into either a first operative position representative of a forward mode of transmission operation or a second operative position representative of a reverse mode of transmission operation. As will be understood, when actuator 40 of the switch assembly 28 is in a first operative position, the switch assembly 28 is conditioned to direct an electrical trigger signal to the appropriate solenoid on the shift valve in a manner resulting in engagement of the forward clutch. When actuator 40 of the switch assembly is in its second, operative position, the switch assembly 28 is conditioned to direct an electrical trigger signal to the appropriate solenoid on the shift valve in a manner hydraulically engaging the reverse clutch.

As illustrated in FIGS. 1 and 2, support 32 is provided with an upstruck shaft 42 which rocks about a first generally vertical axis 44. The shift lever 30 is pivotally connected to the shaft 42 about a second generally horizontal axis 46 and extends in a direction away from switch assembly 28.

Movement of the shift lever 30 is restricted by a gate or slotted plate 50 extending from support 32. As best illustrated in FIG. 3, gate 50 defines a guide slot 52 which is elongated in a sidewise direction and through which shift lever 30 extends. Guide slot 52 defines two spaced but joined detents 54 and 56 provided on opposite sides of an apex-like central portion 58 of slot 52. The detents 54 and 56 correspond to the two modes of operation of the mechanism and are each located below the central portion 58 of the guide slot 52. Guide slot 52 further defines a generally convex camming surface 60 extending upwardly from and between the detents 54 and 56. As will be understood, camming surface 60 facilitates both horizontal and vertical movement of the shift lever 30 as the lever moves between the detents 54 and 56. From the above, it should be appreciated that the guide slot 52 and shift lever 30 are sized by design to require two distinct directions of movement to shift the lever 30 from one position to another.

To facilitate positive engagement of the transmission in either of its two modes of operation, the shift lever 30 is resiliently and positively urged toward a detent of the guide slot 52 through an overcenter spring arrangement. As illustrated in FIG. 2, shift lever 30 is provided with a depending leg 64 which extends through the support 32 and is arranged to one side of the horizontal pivot axis 44 of lever 30. An anchor pin 66 is secured to and depends from support 32 on the opposite side of the horizontal pivot axis 44 of lever 30. Opposite ends of an over-center spring 68 are attached to the anchor pin 66 and leg 64 of shift lever 30 to provide both a constant downward and side-to-side force on the shift lever 30.

The shift lever 30 is operatively connected to the switch assembly 28 through a lost motion mechanism 70 which allows relative movement between the shift lever 30 and the actuator 40 of the switch assembly. In a preferred form, the lost motion mechanism 70 includes a switch actuator plate 72 which is rotated in a generally horizontal path about the pivot axis 44 in response to side-to-side movement of shift lever 30. As illustrated, plate 72 defines a sidewise elongated slot 74 whose ends are disposed on opposite sides of the switch assembly actuator 40. The elongated slot 74 in the actuator plate 72 is preferably sized to allow relative movement between an inner end of the shift lever 30 and the switch actuator 40 and such that extended movement of the shift lever 30 between the spaced detents in the gate results in consequent movement of the switch actuator 40 from one operative position to another operative position.

Turning to FIG. 4, to reduce exposure to dust, dirt and the like, a housing 76, beyond which shift lever 30 extends, encloses those parts of the control mechanism which are carried on support 32. The housing 76 may be secured to the support 32 and about the steering column as for example by the use of suitable bushings and threaded fasteners 75.

To insure a complete understanding of the present invention, a brief description of its operation is as follows. The over-center shift lever arrangement of the present invention inhibits inadvertent shifting of lever 30 from one detent to another by requiring two distinct directions of shift lever movement to insure transmission shifting from one mode of operation to another.

When the shift lever 30 is in substantial alignment with the central portion 58 of the guide slot, the leg 64 on lever 30, pivotal axis 44, and anchor pin 66 are arranged along a substantially straight line. As will be appreciated, the over-center spring biased arrangement provided by the present invention, impedes the shift lever 30 from being located between the two detents 54 and 56. The over-center spring coacts with the camming surface 60 to automatically move the shift lever 30 into a nesting relationship with that detent in the guide slot 52 closest to the shift lever.

As mentioned, the gate 50 and lever 30 are sized by design to require two distinct directions of motion to shift the lever 30 from one detent portion to the other. That is, the shift lever 30 must concomitantly move both vertically and horizontally to shift from one detent to the other. Such design substantially eliminates inadvertent shifting of the transmission. Moreover, movement of the lever 30 is facilitated by arranging it within easy reach of the steering wheel for the tractor.

The lost motion mechanism 70 of the present invention allows relative movement between the shift lever 30 and the switch actuator 40 such that extended movement of the shift lever 30 between the spaced detents in the gate results in consequent movement of the actuator 40 of switch assembly 28 between operative positions. Preferably, consequent movement of the switch actuator 40 occurs as the shift lever 30 nests in a detent of the guide slot. As explained above, the nesting of the shift lever 30 in either of its two positions is assured by a combination of the over-center and downward action of the spring 68 acting against the lever.

When the actuator 40 of switch assembly 28 changes its operative position, an electrical trigger signal is directed to the controller 26 whereby disengaging one clutch while engaging the other and therefore influencing the operation of the transmission.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A directional control system for positively engaging a mechanism in either of two modes of operation, said control system comprising:
   controller means for engaging said mechanism in either mode of operation as a function of electrical signals received thereby;
   electrical switch means for directing electrical signals to said controller means, said electrical switch means including a switch actuator movable between two operative positions to control the signals directed by said switch means to said controller means as a function of the operative position of said switch actuator; and
   an operator controlled lever for controlling the operative position of said switch actuator and thereby the mode of operation of said mechanism, said lever being positively retained in either of two positions by an over-center arrangement including a support, a shaft rockable about a first axis in the support, with said lever being pivotally connected to said shaft about a second axis and extending through a slotted opening in a gate, said slotted opening in said gate defining at opposite ends thereof two spaced detents corresponding to the two modes of operation of said mechanism, said slotted opening being configured such that as said lever is moved between detents the lever is caused to move conjointly about both of said axes, resilient means connected to said support for positively retaining the lever in either of said two detents and to impede said lever from being inadvertently located between said two detents, and means responsive to movement of and for interconnecting an inner end of said lever to said switch means to allow relative movement therebetween such that extended movement of said lever between the detents results in movement of said switch actuator between operative positions thereby facilitating positive engagement of the mechanism and inhibiting inadvertent shifting of the mechanism between modes of operation.

2. The control arrangement according to claim 1 wherein said first axis permits said lever to rock from side-to-side and said second axis permits said lever to conjointly rock up and down, and wherein said resilient means is an over-center spring which is attached to said lever to provide both a constant downward and side-to-side force on said lever.

3. The control arrangement according to claim 1 wherein said interconnecting means includes actuation means extending from said shaft in a first radial direction while said lever extends from said shaft in a radial direction opposite to said first radial direction.

4. A positive directional control system for a transmission having forward and reverse modes of operation, said control system comprising:
   electrically controlled shift valve means for hydraulically engaging said transmission in either mode of operation as a function of electrical trigger signals received thereby;
   switch means connected to an electrical power source for directing the electrical trigger signals to said shift valve means, said switch means including a switch actuator movable between two operative positions, said switch means directing the trigger signals and thereby regulating operation of said shift valve means as a function of the operative position of said switch actuator; and an over-center operator controlled shift lever for controlling the operative position f said switch actuator and thereby the mode of operation of said transmission, said lever passing through a gate and being pivotally connected to a support for combined horizontal and vertical movement between forward and reverse positions corresponding to the forward and reverse modes of operation of said transmission, the forward position of said lever being defined by said gate on one side of a center position and the reverse position of said lever being defined by said gate on an opposite side of said center position, said lever being resiliently urged toward either a forward or reverse position depending upon the disposition of said lever with respect to said center position thereby positively engaging the transmission in either a forward or reverse mode of operation, and means for interconnecting said lever and said switch means, said interconnecting means allowing for relative movement between said lever and said switch actuator such that extended movement of said lever between positions results in consequent movement of the switch actuator between operative positions thereby facilitating positive engagement of the transmission and inhibiting inadvertent shifting of the transmission between forward and reverse modes of operation.

5. The control arrangement according to claim 4 further including a shaft rockable about first axis in the support and having said shift lever pivotally connected thereto about a second axis extending generally normal to the first axis to allow said shift lever to move side-to-side and vertically.

6. The control arrangement according to claim 4 wherein the center position of said gate is vertically positioned above said forward and reverse positions and a spring normally urges said shift lever toward either a forward or reverse position depending upon the disposition of the shift lever with respect to the center position.

* * * * *